(12) United States Patent
Akopian et al.

(10) Patent No.: US 10,470,161 B2
(45) Date of Patent: Nov. 5, 2019

(54) METHOD AND SYSTEM FOR MEASUREMENT AND CHARACTERIZATION OF CHANNEL DELAYS FOR BROADBAND POWER LINE COMMUNICATIONS

(71) Applicants: David Akopian, San Antonio, TX (US); Grant Huang, Austin, TX (US); C. L. Philip Chen, Helotes, TX (US)

(72) Inventors: David Akopian, San Antonio, TX (US); Grant Huang, Austin, TX (US); C. L. Philip Chen, Helotes, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 9 days.

(21) Appl. No.: 15/548,870

(22) PCT Filed: Feb. 5, 2016

(86) PCT No.: PCT/US2016/016763
§ 371 (c)(1),
(2) Date: Aug. 4, 2017

(87) PCT Pub. No.: WO2016/127048
PCT Pub. Date: Aug. 11, 2016

(65) Prior Publication Data
US 2018/0035404 A1 Feb. 1, 2018

Related U.S. Application Data

(60) Provisional application No. 62/112,746, filed on Feb. 6, 2015.

(51) Int. Cl.
*H04W 72/00* (2009.01)
*H04L 1/16* (2006.01)
(Continued)

(52) U.S. Cl.
CPC ......... *H04W 72/005* (2013.01); *H04L 1/1685* (2013.01); *H04L 1/248* (2013.01);
(Continued)

(58) Field of Classification Search
CPC . H04W 72/005; H04W 24/00; H04W 52/225; H04L 1/1685; H04L 1/248;
(Continued)

(56) References Cited

U.S. PATENT DOCUMENTS 5,325,397 A * 6/1994 Scholz ................. H04L 1/24
375/224
8,484,592 B1 * 7/2013 Kocan ................. G06F 17/5031
716/108

(Continued)

OTHER PUBLICATIONS

International Search Report for PCT/US2016/016763 dated May 11, 2016.
(Continued)

*Primary Examiner* — Warner Wong
(74) *Attorney, Agent, or Firm* — Thomas Horstemeyer, LLP

(57) ABSTRACT

Disclosed are various embodiments for a system and method of measuring and characterizing a PLC communication network comprising transmitting a plurality of packets from a PLC master device to a PLC terminal device via a PLC communication network, measuring a plurality of round-trip time (RTT) timestamps for the plurality of packets in the PLC master device, determining an observed probability density function based on the plurality of RTT timestamps, approximating a plurality of probability density functions, determining a rating for the probability density functions based on a comparison of the probability density functions to the observed probability density function, characterizing the PLC communication network based on the ratings of the plurality of probability density functions, and scheduling subsequent transmissions based on the characterization of the PLC Communication network.

20 Claims, 17 Drawing Sheets

(51) Int. Cl.
*H04L 1/24* (2006.01)
*H04L 5/14* (2006.01)
*H04W 52/22* (2009.01)
*H04L 12/24* (2006.01)
*G06F 11/34* (2006.01)
*G06F 17/18* (2006.01)
*H04W 84/04* (2009.01)

(52) U.S. Cl.
CPC .......... *H04L 5/1415* (2013.01); *H04L 5/1423* (2013.01); *G06F 11/34* (2013.01); *G06F 17/18* (2013.01); *H04L 41/142* (2013.01); *H04W 52/225* (2013.01); *H04W 84/04* (2013.01)

(58) Field of Classification Search
CPC ................ H04L 5/1415; H04L 5/1423; H04L 2012/2843; H04L 2012/5628; H04L 27/2686; H04L 43/0864; H04L 47/283; H04L 41/142; G06F 17/17; G06F 17/18; G06F 17/2818; G06F 111/34; G06F 111/3452; G06F 2201/835; G06F 2101/14
See application file for complete search history.

(56) References Cited

U.S. PATENT DOCUMENTS

| | | | |
|---|---|---|---|
| 9,444,566 B1* | 9/2016 | Mustiere | H04J 3/0667 |
| 2005/0094628 A1* | 5/2005 | Ngamwongwattana | H04L 1/0002 370/352 |
| 2008/0148205 A1* | 6/2008 | Homma | G06F 17/5031 716/113 |
| 2008/0259799 A1 | 10/2008 | Van Beek | |
| 2009/0259445 A1* | 10/2009 | Bedrosian | H04L 43/50 703/2 |
| 2011/0134766 A1* | 6/2011 | Zampetti | H04J 3/0682 370/252 |
| 2012/0269204 A1* | 10/2012 | Zampetti | H04J 3/0667 370/503 |
| 2013/0181848 A1 | 7/2013 | Picard | |

OTHER PUBLICATIONS

Huang, Grant; Akopian, David; and C.L. Philip Chen, "Measurement and Characterization of Channel Delays for Broadband Power Line Communications," pp. 1-8, 2014 IEEE.

* cited by examiner

TABLE I

PDF; P(x)

| Probability Distribution | Probability Density Function (PDF); P(x) | Parameters to be estimated |
|---|---|---|
| Lognormal | $\frac{1}{x\sigma_L \sqrt{2\pi}} \exp\left(-\frac{1}{2\sigma_L^2}(\ln(x)-\mu_L)^2\right)$ | $\mu_L$: mean; $\sigma_L$: standard deviation |
| Gamma | $\frac{1}{\Gamma(a)b}\left(\frac{x}{b}\right)^{a-1} \exp\left(-\frac{x}{b}\right)$ | a: shape parameter; b: scale parameter |
| Gaussian | $\frac{1}{\sigma_G \sqrt{2\pi}} \exp\left(-\frac{(x-\mu_G)^2}{2\sigma_G^2}\right)$ | $\mu_G$: mean; $\sigma_G$: standard deviation |
| Rician | $\frac{x}{R^2} \exp\left(\frac{-(x^2+s^2)}{2R^2}\right) I_0\left(\frac{xs}{R^2}\right)$ | $I_0$: Bessel function of the first kind; R: scale parameter; s: noncentrality parameter |

FIG. 10

TABLE II
COMPARISON WITH VALUES OF MEAN AND VARIANCE
TO DEFINE THE STRONG AND WEAK SCENARIOS

|  | Testing locations | Mean (ms) | Variance |
|---|---|---|---|
| Strong signals | A | 2.78 | 2.7 |
|  | B | 2.86 | 2.4 |
|  | C | 2.73 | 2.3 |
|  | D | 2.73 | 2.3 |
|  | E | 2.7 | 1.9 |
|  | H | 2.74 | 1.95 |
|  | I | 2.81 | 2.5 |
|  | Joint strong signals (A,B,C,D,E,H, and I) | 2.74 | 2.28 |
| Weak signals | F | 7.44 | 15.12 |
|  | G | 5.34 | 15.68 |
|  | J | 5.12 | 14.89 |
|  | Joint weak signals (F,G, and J) | 5.13 | 8.27 |

FIG. 11

TABLE III

QUALITY-OF-FIT MEASUREMENTS FOR THE REFERENCED LOCATION
AND JOINT WEAK AND STRONG SIGNAL CONDITIONS

| Testing location | Models | Estimated parameters | Quality-of-fit | | |
|---|---|---|---|---|---|
| | | | KS | Difference | Squared difference |
| Reference | M1 | $\mu_L=0.93$; $\sigma_L=0.37$ | 0.19 | 1080.9 | 141.29 |
| | M2 | $A=15.5E-2$; $B=84.5E-2$; $\mu_L=0.91$; $\sigma_L=0.32$; $s=0.04$; $R=1.80$ | 0.20 | 1004.4 | 101.99 |
| | M3 | $B=59.09E-2$; $C=40.91E-2$; $\mu_L=0.88$; $\sigma_L=0.28$; $a=11.69$; $b=0.22$ | 0.17 | 980.1 | 107.82 |
| | M4 | $A=0.62E-2$; $B=68.16E-2$; $C=31.22E-2$; $s=11.34$; $R=0.56$; $\mu_L=0.70$; $\sigma_L=0.08$; $a=1.57$; $b=5.62$ | 0.15 | 928.1 | 96.03 |
| | M5 | $A=78.85E-2$; $B=3.84E-2$; $C=4.76E-2$; $D=12.55E-2$; $s=0.15$; $R=2.28$; $\mu_L=0.70$; $\sigma_L=0.02$; $a=5.48$; $b=0.44$; $\mu_G=2.79$; $\sigma_G=1.68$; | 0.25 | 1257.8 | 181.79 |

FIG. 12A

| | | | | | |
|---|---|---|---|---|---|
| Joint weak signals | M1 | $\mu_L=1.49; \sigma_L=0.53$ | 0.11 | 1091.3 | 65.58 |
| | M2 | A=41.57E-2;<br>B=58.43E-2;<br>$\mu_L=1.39; \sigma_L=0.39$;<br>s=0.22; R=3.65 | 0.14 | 2309 | 221.57 |
| | M3 | B=51.37E-2;<br>C=48.63E-2;<br>$\mu_L=1.38; \sigma_L=0.38$;<br>a=5.86; b=0.77 | 0.15 | 2826.3 | 328.28 |
| | M4 | A=27.68E-2;<br>B=34.88E-2;<br>C=37.44E-2;<br>s=7.10; R=1.01<br>$\mu_L=0.82; \sigma_L=0.11$;<br>a=69.96; b=0.07 | 0.08 | 1236.2 | 64.56 |
| | M5 | A=66.42E-2;<br>B=11.21E-2;<br>C=22.1E-2;<br>D=0.37E-2;<br>s=3.67; R=3.29<br>$\mu_L=0.80; \sigma_L=0.07$;<br>a=52.23; b=0.09<br>$\mu_G=2.98; \sigma_G=0.04$; | 0.07 | 1002 | 44.33 |
| Joint strong signal | M1 | $\mu_L=0.93; \sigma_L=0.35$ | 0.19 | 2900.9 | 396.34 |
| | M2 | A=13.72E-2;<br>B=86.28E-2;<br>$\mu_L=0.90; \sigma_L=0.31$;<br>s=0.06; R=1.76 | 0.20 | 2532.8 | 303.75 |
| | M3 | B=61.75E-2;<br>C=38.25E-2;<br>$\mu_L=0.88; \sigma_L=0.27$;<br>a=12.78; b=0.20 | 0.16 | 2476.9 | 282.54 |
| | M4 | A=10.81E-2;<br>B=28.71E-2;<br>C=60.48E-2;<br>s=2.27; R=0.31<br>$\mu_L=0.68; \sigma_L=0.04$;<br>a=9.95; b=0.28 | 0.09 | 1497.3 | 95.18 |
| | M5 | A=12.26E-6;<br>B=28.26E-2;<br>C=34.58E-2;<br>D=37.15E-2;<br>s=2.17; R=1.88<br>$\mu_L=0.75$;<br>$\sigma_L=3.5E-4$;<br>a=9.12; b=0.33<br>$\mu_G=2.07; \sigma_G=0.19$; | 0.15 | 2307.4 | 207.67 |

FIG. 12B

TABLE IV

ESTIMATED PARAMETERS OF THE HYBRID MODEL ($M_3$) AT THE
LOCATION A WITH CORRESPONDING CONFIDENCE LIMITS

| Estimated Parameters | B = 59.09E − 2 | C = 40.91E − 2 | $a =$ 11.69 | $b =$ 0.22 | $\mu_L =$ 0.88 | $\sigma_L =$ 0.28 |
|---|---|---|---|---|---|---|
| Confidence limits for estimated parameters | 56.44E − 2 to 61.47E − 2 | 38.53E − 2 to 43.56E − 2 | 10.65 to 12.73 | 0.20 to 0.24 | 0.87 to 0.90 | 0.27 to 0.29 |

FIG. 13

METHOD AND SYSTEM FOR MEASUREMENT AND CHARACTERIZATION OF CHANNEL DELAYS FOR BROADBAND POWER LINE COMMUNICATIONS

CROSS REFERENCE

This application is the 35 U.S.C. § 371 national stage application of PCT Application No. PCT/US2016/0016763, filed Feb. 5, 2016, where the PCT claims the benefit of U.S. Provisional Application entitled "METHOD AND SYSTEM FOR MEASUREMENT AND CHARACTERIZATION OF CHANNEL DELAYS FOR BROADBAND POWER LINE COMMUNICATIONS" filed on Feb. 6, 2015 and assigned application No. 62/112,746, both of which are herein incorporated by reference in their entireties.

BACKGROUND

In recent years, a growing number of home-networking applications and rising concerns regarding wireless signaling interference have energized interest in power line communications (PLC) that use existing power lines and outlet infrastructure for data transmissions.

Generally, PLC can be operated in two frequency bands, narrowband (NB-PLC, 3-500 kHz) and broadband (BB-PLC, 1.8-250 MHz). NB-PLC is popular in smart grid applications, has a longer range (up to several kilometers), and operates at low data rates of up to several hundred kilobits per second, while BB-PLC is mainly used for last-mile Internet distribution and home networking and provides for higher data rates of up to several hundred megabits per second.

While general concepts of home networking over power lines were proposed long ago, electromagnetic interference was a challenge for early PLC solutions and the broad adoption of PLC technologies was initially delayed because of the lack of international technical standards from globally recognized standard-setting organizations. Currently, PLC technologies have matured and support high-speed data rates of more than 100 Mb/s and are being promoted by several industry alliances including the HomePlug Alliance, Universal Powerline Association, the high-definition PLC (HD-PLC) Alliance, and the HomeGrid Forum. Several standards are already available such as International Telecommunication Union (ITU-T) G.hnem and IEEE 1901.2 for NB-PLC, and Telecommunications Industry Association-1113, IEEE 1901, and ITU-T G.hn for BB-PLC.

Current options for modeling PLC network delays are limited to transfer functions and channel impulse response functions. Transfer functions and channel impulse responses limit the analysis of the propagation delay to a systematic level. These models fail to recognize the variability of delays that occur within a real world complex communications system, such as delays based on packet size, channel load, packet collision, and the selected route to a destination.

From the foregoing discussion, it can be appreciated that it would be desirable to have alternative methods for modeling delays on a PLC Network that avoid the drawbacks of the current method.

DESCRIPTION OF THE DRAWINGS

FIG. 10 illustrates analytical forms of various distributions.

FIG. 11 illustrates a comparison with values of mean and variance to define the strong and weak scenarios FIGS. 12A and B illustrate quality-of-fit measurements.

FIG. 13 illustrates estimated parameters of the hybrid model with corresponding confidence limits.

DETAILED DESCRIPTION

As described above, it would be desirable to accurately model end-to-end delays on various PLC networks that avoid the drawbacks of the current methods. Disclosed herein are examples of such methods. Some embodiments involve the use of a measured set of data comprising measured delays in the end-to-end communications on a system to better estimate the real world delays of the system. This can be accomplished by comparing various weighted probability distribution models to the empirical measured data to identify the best probability distribution model for the communication system. The end-to-end delays on a PLC network can also be characterized based on a comparison of the model that best fits to the measured data against a database of previous characterization. By way of example, if measured data fits best to a first regression model, the measured PLC network may represent a weak signal location whereas if measured data fits best to a second regression model, the measured PLC network may represent a strong signal location. This modeling and characterization can be utilized to improve the PLC network by better predicting delays within the system or to better determine the root causes of a delay within a system.

In the following disclosure, various specific embodiments are described. It is to be understood that those embodiments are example implementations of the disclosed inventions and that alternative embodiments are possible. All such embodiments are intended to fall within the scope of this disclosure.

The methods disclosed herein enable the transmitting of packets from a PLC master device to a PLC terminal device through a PLC network, measuring round-trip time (RTT) timestamps for the packets at the PLC master device, determining an empirical probability density function from the RTT timestamps, and approximating probability density functions. Different weighted combinations of probability distributions fit different characterizations of PLC networks better. By characterizing the PLC network, improvements that apply to only certain characterizations can be selectively deployed to decrease delays on PLC networks.

Figure 1:
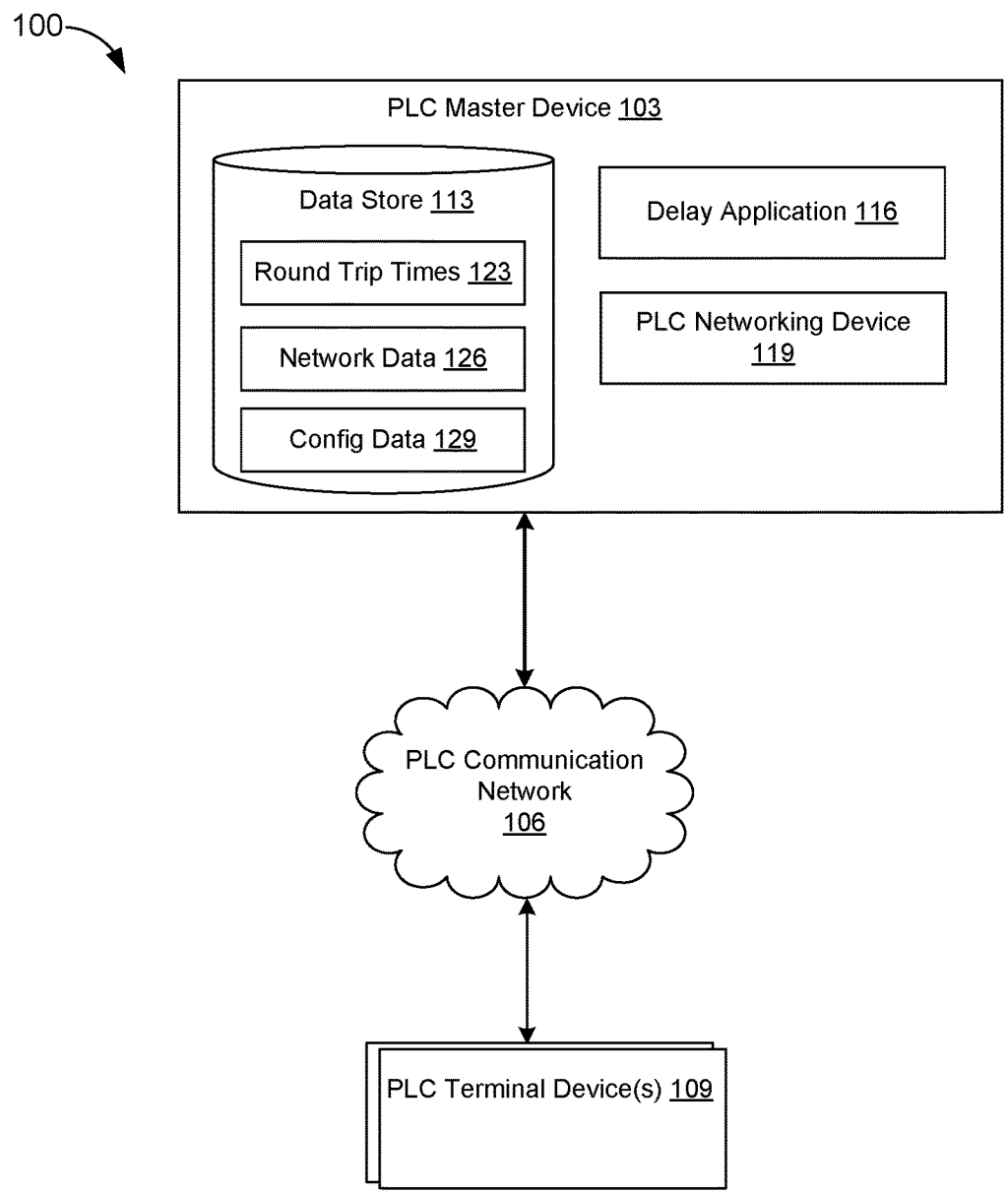
FIG. 1 is an illustration of a PLC environment according to various embodiments of the present disclosure.
Figure 14:
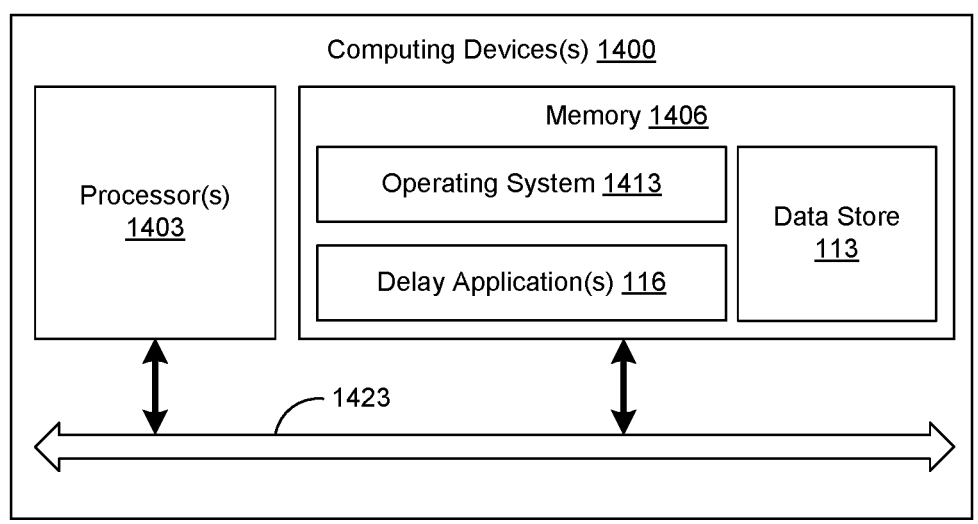
FIG. 14 is a computing device according to various embodiments of the present disclosure.

With reference to FIG. 1, shown is a PLC environment 100 according to various embodiments. The PLC environment 100 may include a PLC master device 103, a PLC communication network 106, and one or more PLC terminal devices 109. A PLC terminal device 109 can be a PLC master device 103. The PLC master device 103 can include a data store 113, a delay application 116, a PLC networking device 119, and other components. The delay application 116 can communicate on the PLC communication network 106 using the PLC networking device 119. As an example, the delay application 116 can transmit data through the PLC communication network 106 to PLC terminal devices 109. The PLC master device 103 can be a computing device, such as a computing device 1400 (FIG. 14).

The PLC networking device 119 can be communicably coupled to a processor within the PLC master device 103. In another embodiment, the PLC networking device 119 can be an external device. In this embodiment, the delay application 116 can transmit and receive data to the PLC networking device 119 through another data communication medium, and the PLC networking device 119 can transmit and receive the data on the PLC communication network 106.

The PLC master device 103 and PLC terminal devices 109 can be connected to the PLC communication network 106. The PLC master device 103 and PLC terminal devices 109 can each transmit and receive packets and responses to the packets on the PLC communication network 106. The round-trip times (RTT) for each of the packets can be measured by a respective PLC master device 103 or PLC terminal device 109. In one embodiment, the PLC master device 103 can determine a quality of signal for the PLC communication network 106 based on the measured RTT for packets transmitted and received on the PLC communication network 106.

The PLC communication network 106 can include multiple network paths. Each of the plurality of network paths can represent a path between a unique pair of PLC devices, such as between the PLC master device 103 and a PLC terminal device 109. A quality of signal of the PLC communication network 106 can correspond to one of the network or communication paths between any two PLC devices. As an example, the PLC master device 103 can have a quality of signal on a network path to a first PLC terminal device 109. That quality of signal can differ from a quality of signal between the PLC master device 103 and a second PLC terminal device 109. The PLC master device 103 can determine a quality of signal for the network paths to each of the PLC terminal devices 109.

The quality of signal for a network path can be determined based on a statistical property such as a calculated probability density function (PDF), a comparison of a calculated PDF to ones of a plurality of approximated PDFs based on probability distributions, a mean of round trip times 123 for a network path, variances in the round trip times 123 for a network path, or standard deviation of the round trip times 123 for a network path.

The PLC devices can be configured to receive packets on the PLC communication network 106. When a PLC device receives a packet, the PLC device can transmit a response acknowledging receipt of the packet. A PLC master device 103 can transmit packets on the PLC communication network 106 and measure a response time until an acknowledgement is received from a PLC terminal device 109. The response time can be recorded in round trip times 123 associated with the PLC terminal device 109.

The PLC master device 103 can characterize a network path on the PLC communication network 106 based on an observed statistical property of the round trip times 123 corresponding to the network path. The PLC master device 103 can adjust the scheduling of subsequent packet transmissions based on the statistical property. For example, the PLC master device 103 can configure or set configuration data 129 based on the statistical property. The configuration data 129 can specify communication properties of the PLC networking device 119.

In one example, configuration data 129 corresponding to one or more network segments can be transmitted to a PLC master device 103 or PLC terminal device 109. The configuration data 129 can include a digital model of the one or more network paths on PLC communication network 106. The delay application 116 can determine a characterization of the digital model for a network path. The characterization of a network path on PLC communication network 106 can be approximated based on a delay data generator, probability density functions, a previously measured network delays across a network segments, and other data.

The communication properties can include properties related lower layers of the communications, such as a transport layer of a network path. For example, the communication properties can include inter-byte delay, a speed of data transmission, and whether to use repetition codes, parity bits, checksums, cyclic redundancy checks (CRC), cryptographic hash functions, error-correcting codes, and other methods of data checking. The delay application 116 can configure the communication properties based on the characterizations of the digital model.

An approximated PDFs can be based on a Lognormal PDF, a Gamma PDF, a Gaussian PDF, a Rician PDF, another PDF type, or a combination of more than one PDF types. The comparison of a calculated PDF can be based on a Kolmogorov-Smirnov index or a least square value, among others. The PLC master device 103 can optimize the approximated PDFs based on a Maximum-Likelihood Estimation or a trust region reflective algorithm When modeling a network path of a PLC communication network 106, the physical propagation of a network path can be characterized through channel transfer functions, delay spreads, and various interference effects. Channel capacity can be assessed by taking into account PLC specific distortions. A test-bed can be designed or channel measurements, and the channel dependence on the presence of unmatched and time-variant loads can be determined. Two PLC channel modeling approaches can be used to model a network path. One of the approaches is the bottom-up approach, which utilizes specific network topology models and transmission line theory to estimate a channel transfer function. The second approach is the top-down approach, which is based on parametric channel models and parameter identification using data coming from the measurements.

Propagation delays in communication channels, such as a network path of the PLC communication network 106, degrade user experiences by introducing essential time lags. These degradations can be more noticeable for applications that critically rely on roundtrip cycles such as remote feedback-based control over the networks, remote surgery, gaming applications, or smart home applications based on communication of distributed sensors, controllers, and actuators.

A communication delay for a network path of the PLC communication network 106 can be modeled from a perspective of PLC-enabled applications focusing on end-to-end communication delays of existing PLC solutions. These existing PLC solutions may or may not be tolerable for these applications. Delay measurements of PLC communication network 106 can integrate both physical propagation and packet retransmission delays, and models can be derived using statistical analysis of empirical delay measurements rather than low level modeling of physical propagation phenomena. PLC channel models can address physical propagation aspects while ignoring retransmissions.

According to one embodiment, a modeling process can follow the following steps. A PLC environment, such as PLC environment 100, or a test-bed can be setup to conduct a PLC delay measurement campaign to collect a statistically random delay sample set and obtain empirical delay distribution using the histogram approach. The empirical distribution can be modeled using a mixture of known parameterized analytical probability density functions (PDFs) by estimating the parameters of these distributions and mixture weights, which provide an analytical fit to empirical distribution. The closeness can be assessed using quality-of-fit measures. Such an approach can also be used for web traffic modeling. While network delay modeling approaches can be used for various applications. Statistical characterization of PLC data delays are described herein.

The fitting of empirical distributions by parameterized PDFs can be performed using maximum-likelihood estimators (MLE) and the trust region reflective (TRR) algorithm for a representative PLC environment 100. The model parameters will essentially depend on settings within PLC environment 100, but the statistical modeling approach can be applicable for arbitrary PLC environments 100. Thus, numerical data for the optimized models can characterize the PLC environment 100 used.

According to one embodiment, off-the-shelf BB-PLC equipment with state-of-the-art representative transceivers can be used. In another embodiment, physical channel measurement test-beds relying on a sounder-analyzer-based approach can be used. A software analyzer can measure delays occurring during packet transmissions, which can include both physical and retransmission delays.

Figure 2:
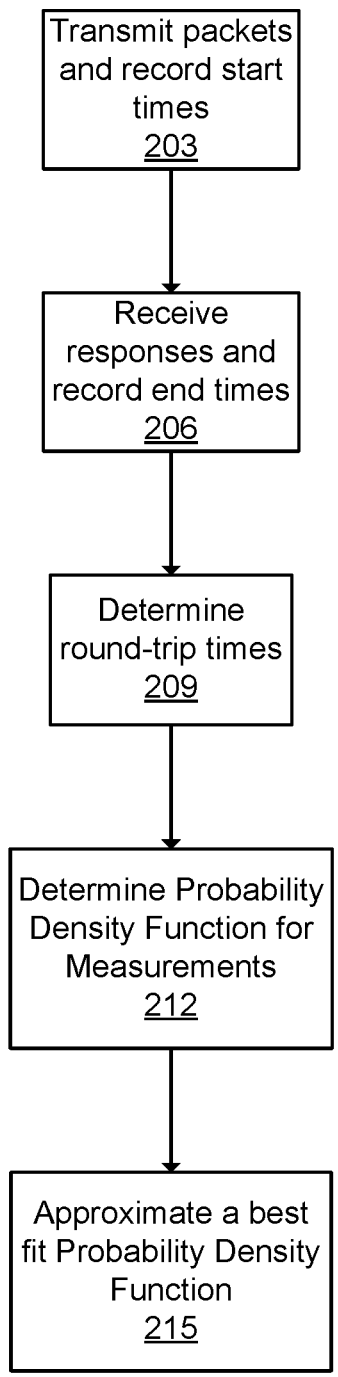
FIG. 2 is a flowchart illustrating one example of functionality implemented as portions of a delay application executed in a computing device of FIG. 2 according to various embodiments of the present disclosure.

With reference to FIG. 2, shown is a flowchart of a process to measure empirical delays on a network and determine a best fit probability density function according to various embodiments. It is understood that the flowchart of FIG. 2 provides merely an example of the many different types of processes that may be employed to measure empirical delays on a network and determine a best fit probability density function as described herein. The flowchart of FIG. 2 can be viewed as depicting an example of a method implemented in a PLC master device 103 (FIG. 1) according to one or more embodiments.

In step 203, the process involves transmitting packets on a PLC network and recording the initial transmission time of each packet. For example, the delay application 116 may transmit various packets on PLC communication network 106 to a client device, such as one of PLC terminal devices 109. In some embodiments, the start times are stored in data store 113, while in others the start times are stored in memory until a response is received and the delay is recorded in round trip times 123.

In step 206, the process involves receiving responses to the packet transmissions on a PLC network and recording the time the response is received as an end time. For example, the delay application 116 may receive a response to each packet transmitted from the PLC master device 103 over PLC communication network 106. The delay application 116 can then store the times when each response is received similarly to the start times.

In step 209, the process involves determining the round-trip times for each packet by subtracting the start time from the end time to calculate a measured end-to-end delay. For example, the delay application 116 can utilize the start and end times for the plurality of packets stored in memory or data store 113, subtract them to calculate a delay, and store the result back in round trip times 123.

In step 212, the process involves determining an empirical probability density function of the plurality of round-trip times. For example, the delay application 116 can utilize the round trip times 123 for packets transmitted on the system to determine an empirical probability density function.

In step 215, the process involves approximating probability density functions based on a various probability distributions and weighted combinations of the various probability distributions, and finding which probability density function best fits the empirical probability density function. For example, delay application 116 may calculate various probability distributions and weighted combinations of the various probability distributions to find a best fitting approximation of the empirical probability density function.

Figure 3:
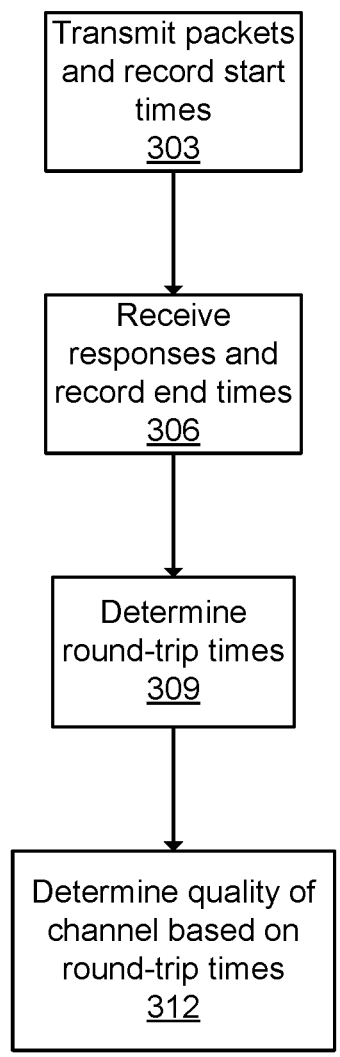
FIG. 3 is a flowchart illustrating one example of functionality implemented as portions of a delay application executed in a computing device of FIG. 2 according to various embodiments of the present disclosure.

With reference to FIG. 3, shown is a flowchart of a process to measure a plurality of channel characteristics and determine quality of a channel on a network according to various embodiments. It is understood that the flowchart of FIG. 3 provides merely an example of the many different types of processes that may be employed to measure empirical delays on a network and determine the quality of a PLC channel as described herein. The flowchart of FIG. 3 may be viewed as depicting an example of a method implemented in a PLC master device 103 (FIG. 1) according to one or more embodiments.

In step 303, the process involves transmitting packets on a PLC network and recording the initial transmission time of each packet. For example, the delay application 116 can transmit various packets on PLC communication network 106 to a PLC terminal device 109. In some embodiments, the PLC master device 103 can be a single device running the delay application 116 to transmit packets to a PLC terminal device 109 over a single path of PLC communication network 106. Yet in other embodiments, the packets can be sent through multiple PLC terminal device 109, each recording the initial transmission times for the plurality of packets sent to each of the other PLC terminal device 109 to determine the quality of various network paths. In some embodiments, the start times are stored in memory, while in others the start times are written to data store 113.

In step 306, the process involves receiving responses to the packet transmissions on the PLC network and recording the time the response is received as an end time. For example, the delay application 116 can receive a response to each packet transmitted from a PLC terminal device 109 over PLC communication network 106. The delay application 16 can then store the times when each response is received similarly to the start times.

In step 309, the process involves determining the round-trip times for each packet by subtracting the start time from the end time to calculate a measured end-to-end delay. For example, the delay application 116 can utilize the start and end times for the plurality of packets from memory or data store 113, subtract them to calculate a delay, and store the result back in memory or data store 113.

In step 312, the process involves determining the quality of the measured channel based on the round-trip times. For example, the delay application 116 can utilize the round trip times 123 corresponding to a network path to determine a quality of the PLC communication network 106. As shown herein, the strength of the signal environment can be determined based on the measured delay statistics. In some embodiments, the signal can be categorized as strong or weak. The categorization can be stored in network data 126 associated with the network path. As an example, the PLC master device 103 can determine that a network path over PLC communication network 106 to a PLC terminal device 109 is weak, and store data describing the path to the PLC terminal device 109 as weak within network data 126. In other embodiments, the strength can be assigned a value within a predefined range based on the measured delay statistics. The value corresponding to the quality of the path on PLC communication network 106 can be stored in network data 126 associated with the network path. In one embodiment, the value assigned for a quality of the path is assigned a high value for a strong signal and a low value for a weak signal.

HD-PLC Network Delay Measurement

The RTT delay measurement can be derived from two timestamps associated with request ($T_{request}$) and reply ($T_{reply}$) packets as observed at the host according to the Internet Control Message Protocol (ICMP). Denoting i as the measurement cycle number, i=1, . . . , N, the RTT measurement is obtained as $$T_{delay}(i) = T_{reply}(i) - T_{request}(i). \quad (1)$$

Figure 4:
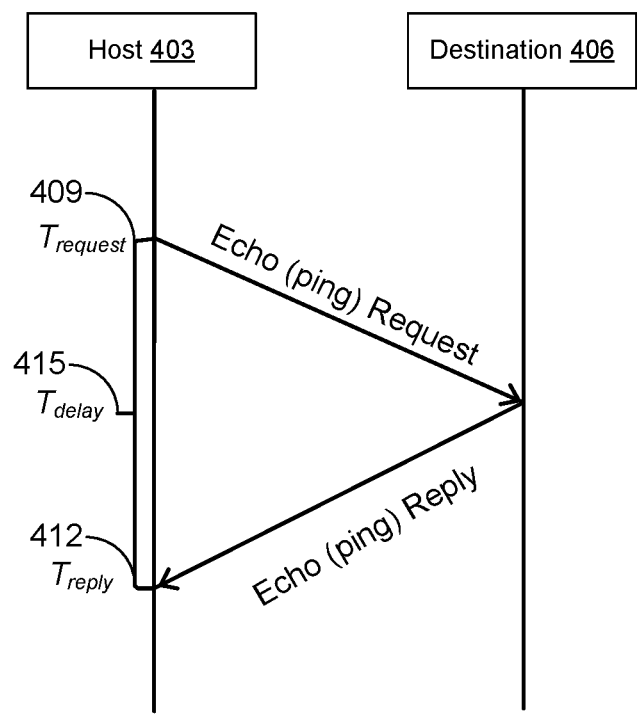
FIG. 4 illustrates the timestamps of ICMP echo packets.

FIG. 4 is an illustration of the RTT communication cycle 400 between the host (terminal) and destination (master). The RTT communication cycle 400 can include a host 403, such as a PLC master device 103 (FIG. 1) and a destination 406, such as a PLC terminal device 109 (FIG. 1). A request message can be transmitted at a time of request 409 by the host 403 to a destination 406 over a network, such as the PLC communication network 106 (FIG. 1). As an example, the delay application 116 can send the request message and record the time of request 409.

The destination 406 can receive the request message and reply with a reply message to acknowledge receipt. For example, a PLC terminal device 109 can receive the request message over PLC communication network 106, and generate a reply message to acknowledge receipt. In one embodiment, a ping is used as the request message and the reply message. The host 403 can receive the reply message and record a time of reply 412 upon receiving the reply message. For example, the delay application 116 can receive the reply message via the PLC networking device 119 (FIG. 1) and record the time of reply 412 in memory or in data store 113 (FIG. 1).

The time of delay 415 can be calculated by subtracting the time of reply 412 from the time of request 409, as shown in equation 1 above. For example, the delay application 116 can calculate the time of delay 415 by subtracting the time of request 409 and time of reply 412. The delay application 116 can store the resulting time of delay 415 in round trip times 123 (FIG. 1) associated with the network path.

To build a statistical framework that is statistically random for various networks, a measurement campaign can be conducted for deriving analytical models. In one example, 6,000 trials can be measured in a measurement campaign. The process can be repeated for several test locations to identify statistical differences depending on relative host destination placements.

Figure 5:
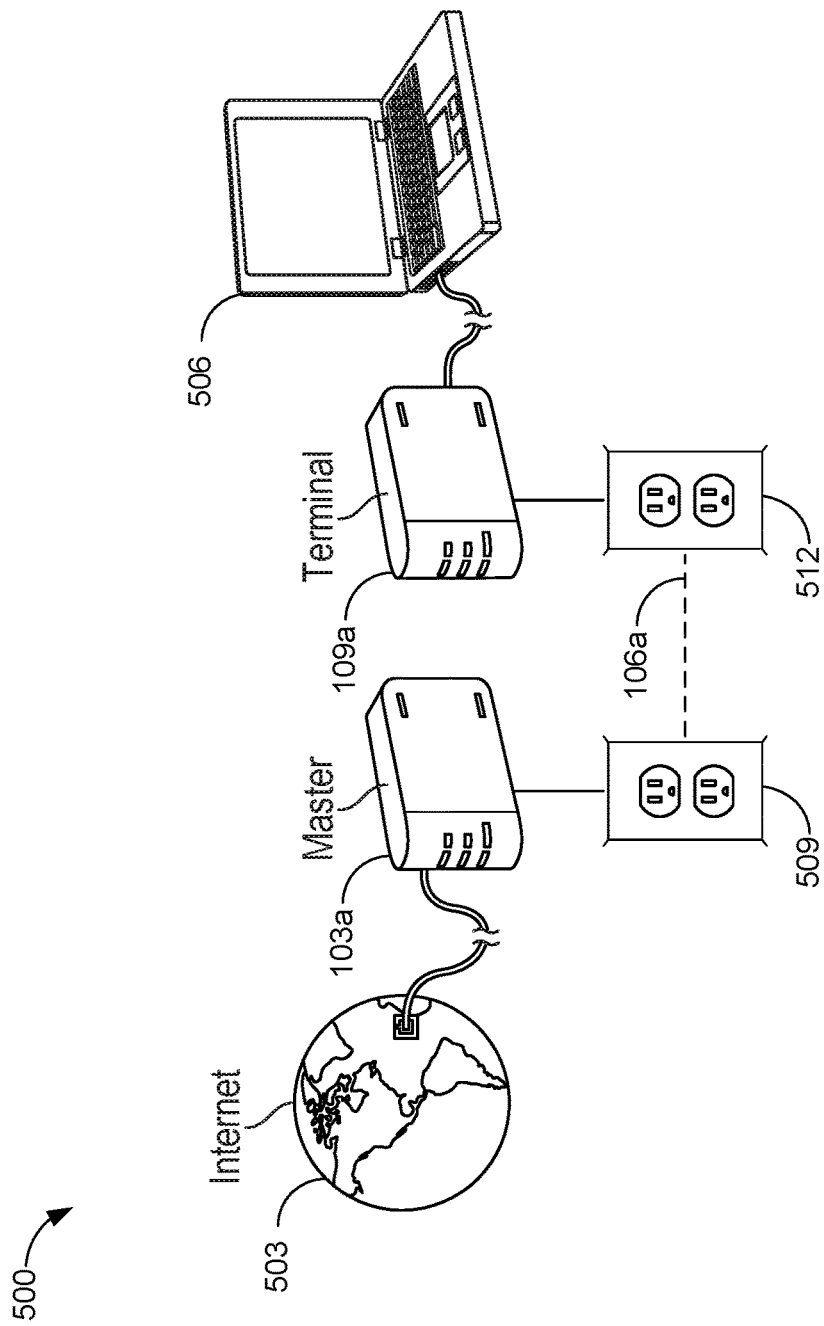
FIG. 5 illustrates an HD-PLC IP network test-bed

With reference to FIG. 5, shown is a PLC environment 500 according to various embodiments. The PLC environment 500 can be a PLC environment 100 (FIG. 1). The PLC environment can include a PLC master device 103a connected through a PLC communication network 106a to a PLC terminal device 109a. The PLC master device 103a can route data traffic for the PLC terminal device 109a to and from an internet 503. A laptop 506 can be connected to PLC terminal device 109a to access the internet 503.

The PLC communication network 106a can include a first power outlet 509 and a second power outlet 512. A power wire connecting the first power outlet 509 to the second power outlet 512 can be referred to as a network path on the PLC communication network 106a. The network path can be associated with both the PLC master device 103a and the PLC terminal device 109a because the network path connects the two PLC devices. The PLC environment 500 can be setup as shown in FIG. 5 for measurement collection using a BB HD-PLC Ethernet adapter. The PLC environment 500 can be comprised of a laptop and two Ethernet adapters (i.e., the PLC master device 103a and the PLC terminal device 109a), which are connected through power lines.

Figure 6:
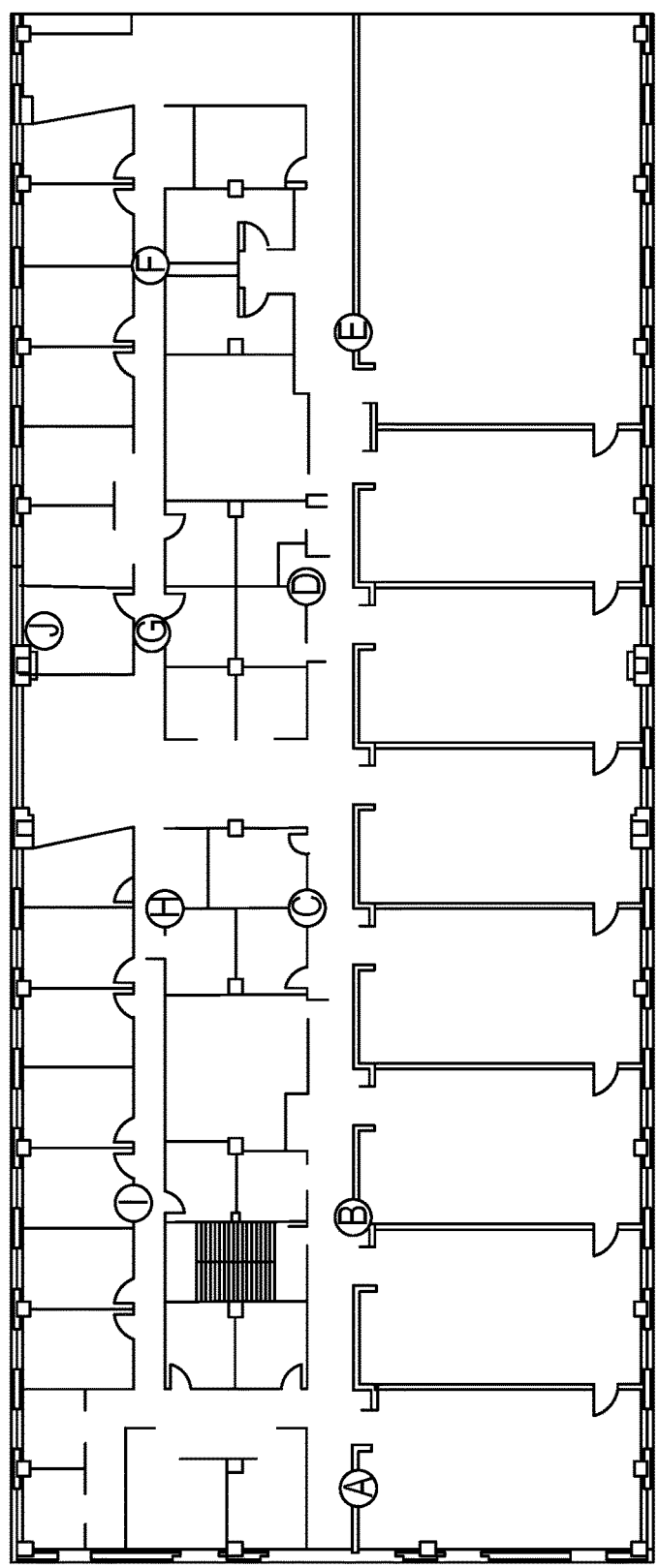
FIG. 6 illustrates testing locations for PLC network delay measurements.

FIG. 6 shows an example test area that includes a floor plan section of the Applied Engineering and Technology building at the University of Texas at San Antonio. A shown, one master and nine terminal testing locations (A through J) are selected for measurement collection. A PLC device, such as a PLC master device 103 (FIG. 1) can be located at Terminal A. Additional PLC devices, such as PLC terminal devices 109 (FIG. 1) can be located at each of Terminals B-J. In this example test area, Terminal A can be referred to as a reference terminal because of the location of a PLC master device 103.

According to one embodiment, the PLC devices can support transmission rates of 210 Mb/s using frequency bands of 2-28 MHz. The PLC devices can use the wavelet orthogonal frequency division multiplexing modulation technology according to the IEEE 1901 standard. Standard U.S. 120 V, 60-Hz ac outlets can be used, for example, the first power outlet 509 and second power outlet 512.

In one embodiment, a diagnostic tool ping can be used to communicate RTT packets and timestamps can be collected using a network analyzer. In general, the ping can generate ICMP echo packets, reports packet loss, and provide a coarse RTT delay. The analyzer can accurately estimate RTT compared with the ping measurements data. The analyzer can record packet timestamps when they are communicated between the host and the destination.

The delay measurement approach can be represented as a final packet delivery delay integrating both physical propagation delays because of distance and multipath and PLC network protocol delays occurring because of retransmissions of lost packets until delivery confirmations are received. While efficiency advancement of PLC transmission systems can rely on understanding physical propagation phenomena, delay-sensitive PLC-enabled applications can be affected by the total integrated delay of available PLC solutions, and high-level-independent modeling of these delays would help to assess these effects.

Software-defined measurement tools that use sending and receiving time stamps can be used to measure integrated delays as they use original PLC communication channels and account for the delays because of specific PLC-modem transients. The delay application 116 (FIG. 1) can include the measurement tools. Measuring within a software application can also be cost-effective by avoiding costly sounder-analyzer instrumentation setups.

Delay Channel Modeling

Communication network delays can be statistically modeled using Weibull, Lognormal, Gamma, Exponential distributions, and their hybrids. A modeling approach within a delay application 116 (FIG. 1) can be used comprising: conducting a delay measurement campaign, obtaining empirical statistical distributions from measurement histograms, and approximating these distributions by parameterized analytical distributions through optimal parameter estimations. Distribution fitting and curve fitting techniques can be used. Quality-of-fit measures for assessing approximation closeness are can also be used. In some embodiments, hybrids (mixtures) of conventional statistical distributions can be used.

Various combinations of conventional Lognormal, Gamma, and Rician distributions can be used to find approximations. These distributions can be taken as a basis. The analytical forms of these distributions are defined in Table I (FIG. 10). These distributions and a mixture of these distributions can be utilized in application for PLC delay modeling, such as delay application 116 (FIG. 1). The following models have been found useful:

$$M_1: P(x) = P_{Lognormal}(x) \quad (2)$$

$$M_2: P(x) = A*P_{Rician}(x) + B*P_{Lognormal}(x) \quad (3)$$

$$M_3: P(x) = B*P_{Lognormal}(x) + C*P_{Gamma}(x) \quad (4)$$

$$M_4: P(x) = A*P_{Rician}(x) + B*P_{Lognormal}(x) + C*P_{Gamma}(x) \quad (5)$$

$$M_5: P(x) = A*P_{Rician}(x) + B*P_{Lognormal}(x) + C*P_{Gamma}(x) + D*P_{Gaussian}(x) \quad (6)$$

where A-D are weights reflecting shares of conventional distributions from Table I (FIG. 10).

Hybrid models $M_2$, $M_3$ are a mixture of two distributions, $M_4$ combines three mixture distributions in (5), and the hybrid model $M_5$ is obtained by combining $M_4$ and the Gaussian distribution in (6). The parameters of mixture components of $M_1$-$M_3$ along with weights (A and B for $M_2$, B and C for $M_3$) are estimated using the MLE. The parameters of the hybrid models $M_4$ and $M_5$, including weights A, B, C, and D, are determined by the TRR algorithm.

To assess the closeness of empirical and analytical distributions, three common quality-of-fit measures can be used, which can show differences between the cumulative distribution functions (CDF) of compared distributions (the lower the index, the better the fit). The measures are the following:

$$D_N^{KSI} = \max_{1 \leq j \leq N} (|F(X_j) - F_e(X_j)|) \quad (7)$$

$$D_N^{DI} = \sum_{j=1}^{N} |F(X_j) - F_e(X_j)| \quad (8)$$

$$D_N^{SDI} = \sum_{j=1}^{N} (F(X_j) - F_e(X_j))^2 \quad (9)$$

where N is the measurement sample size, F(X) is CDF of the analytical distribution and $F_e(X)$ is the empirical distribution, $D_N^{KSI}$ in (7) is called the Kolmogorov-Smirnov (KS) index, $D_N^{DI}$ in (8) is called a difference index, and $D_N^{SDI}$ in (9) defines the squared difference index.

Determination of the Delay Models for Indoor PLC

Delay models for indoor PLC networks can be determined according to the MLE and TRR algorithms, among others. These algorithms can be used to determine parameters of delay models (2)-(6). The parameters can be optimized to fit as closely as possible empirical delay distributions obtained using measured delay data.

A. Maximum-Likelihood Determination

The parameters of the selected single models ($M_1$) and of the mixture of two hybrid models ($M_2$ and $M_3$) can be determined using MLE. As an example, in the case of mixture distribution $M_3$ the six parameters can be the following:

$$\Gamma = [B, C, \mu_L, \sigma_L, a, b]. \quad (10)$$

The MLE method can ensure that the estimated statistical means of ($\hat{\Gamma}_{ML}$) obtained from $M_1$-$M_3$ models converge to those obtained from empirically measured ones ($\Gamma_0$) as follows:

$$\lim_{N \to \infty} \hat{\Gamma}_{ML} = \Gamma_0 \quad (11)$$

where N is the total number of delay measurement values $x_i$, $i = 1, 2, \ldots, N$.

The MLE estimates the parameter set ($\Gamma$) by maximizing the likelihood function ($\Pi_{i=1}^{N} p(x_i | \Gamma)$) as follows:

$$\hat{\Gamma}_{ML} = \arg \max_{\Gamma} \prod_{i=1}^{N} p(x_i | \Gamma). \quad (12)$$

B. TRR Algorithm

For complicated mixture distribution, such as the proposed $M_5$ model, the TRR algorithm can be used. According to some embodiments, the delay application 116 can utilize the TRR algorithm to generate a PDF based on information stored in data store 113. As an example of the TRR algorithm, assume N data points $(x_i, y_i)$, $i = 1, 2, \ldots, N$, from an empirically measured delay data distribution y (normalized histogram), where the value $y_i$ is the empirical PDF value corresponding to delay measurement $x_i$. The TRR determines 11 parameters of the $M_5$ in the least square sense (i.e., by minimizing the sum of the squares of the differences between the estimated theoretical and empirical PDFs). The parameters to be determined can be:

$$\eta = [A(\alpha), B(\alpha, \beta), C(\alpha, \beta, \gamma), D(\alpha, \beta, \gamma), s, R, \mu_L, \sigma_L, a, b, \mu_G, \sigma_G]. \quad (13)$$

The least square approach can be written as follows:

$$\arg \min_{\eta} \left( \sum_{i=1}^{N} (p(\eta, x_i) - y_i)^2 \right) \quad (14)$$

where $p(\eta, x_i)$ is a PDF with the parameter set highlighted in $\eta$.

The $M_8$ model is nonlinear with respect to used parameters and determination of the parameters is subject to the following constraints:

$$A + B + C + D = 1 \quad (15)$$

$$A, B, C, D \geq 0 \quad (16)$$

$$s \geq 0, R \geq 0. \quad (17)$$

The parameters can be parameterized themselves to transform any constrained optimization to an unconstrained one:

$$A(\alpha) = \cos^2(\alpha) \quad (18)$$

$$B(\alpha,\beta) = \sin^2(\alpha)\cos^2(\beta) \quad (19)$$

$$C(\alpha,\beta,\gamma) = \sin^2(\alpha)\sin^2(\beta)\cos^2(\gamma) \quad (20)$$

$$D(\alpha,\beta,\gamma) = \sin^2(\alpha)\sin^2(\beta)\sin^2(\gamma) \quad (21)$$

$$s = |s| \text{ and } R = |R|. \quad (22)$$

Then, the TRR algorithm can be used to solve the abovementioned nonlinear unconstrained optimization problem for $M_5$.

Simulation and Experimental Results

Simulations were performed to evaluate the best fit of probability distribution functions across a variety of different characterizations of systems. Numerical solutions of proposed modeling methods are discussed herein. Additionally, shown herein are illustrations of comparative plots of empirical and parameterized analytical distributions. The estimated optimal parameter values and related quality-of-fits are tabulated. The models described are based at least in part on a variety of representative environments. This methodology can be applied to other test-beds, experimental scenarios, as well as other deployed systems to characterize the system.

Figure 7A:
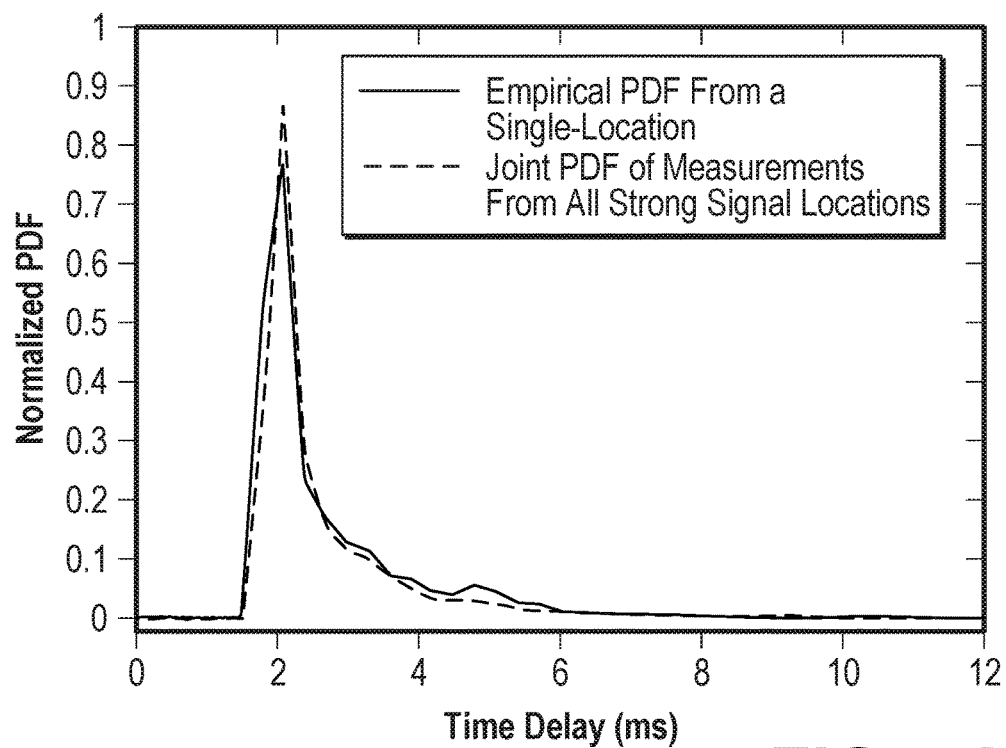
FIGS. 7A and B illustrate empirical PDFs of PLC delay measurements for strong and weak signal conditions.
Figure 7B:
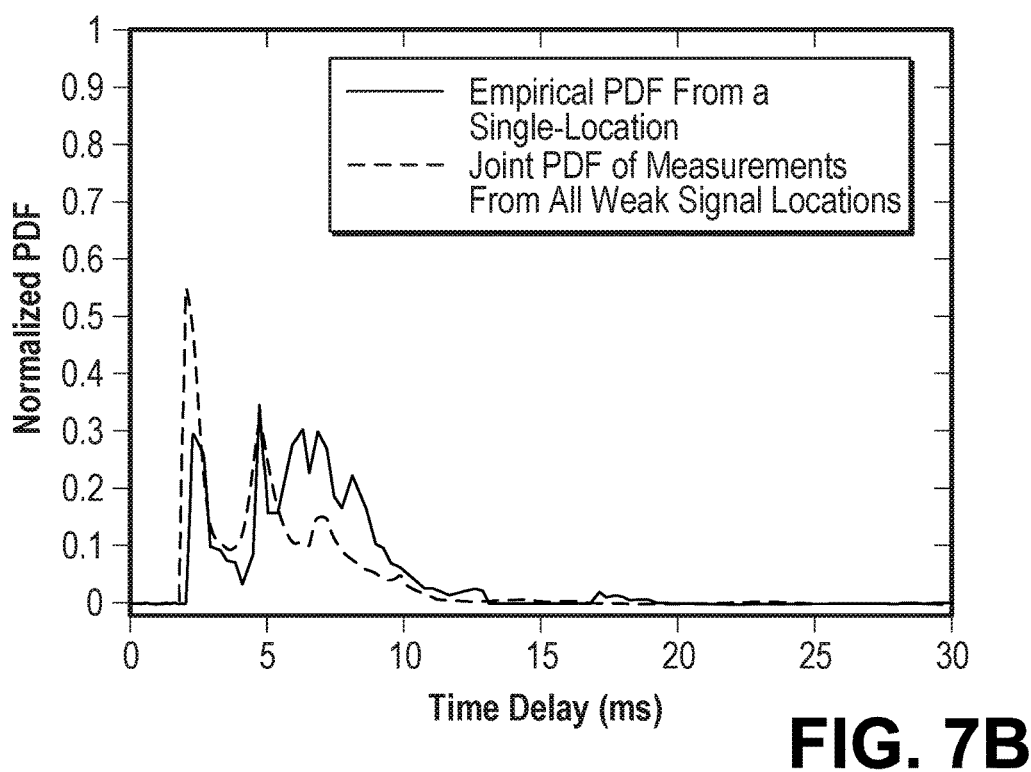

FIGS. 7A and B show empirical PDFs of PLC delay measurements for strong and weak signal conditions. Empirical PDFs of PLC delay measurements are shown for strong and weak signal conditions from a single location with FIG. 7A showing a joint strong signal condition and FIG. 7B showing a joint weak signal condition. FIG. 7A illustrates joint PDF of measurements from all strong signal locations along with the PDF from a single-location A, as shown in FIG. 6. The RTT delay measurement can be derived from two timestamps associated with request ($T_{request}$) and reply ($T_{reply}$) packets as observed at the host according to the Internet Control Message Protocol (ICMP). Denoting i as the measurement cycle number, i=1, . . . , N, the RTT measurement is obtained as:

$$T_{delay}(i) = T_{reply}(i) - T_{request}(i). \quad (1)$$

Strong signal PDFs can be seen as similar for single-location, and joint PDFs. Weak signal PDFs can be seen with differences in joint and single-location (F) PDFs. Weak signal location PDFs included a primary peak similar to the strong signal locations, and included secondary peaks, which can be different for each location. Joint weak signal variance were reduced compared with the individual location PDFs based on these peak characteristics.

The composition of weak signal pdf can resemble a multipath propagation pattern but should be interpreted in a different way. The composition of weak signal pdf is not a multipath phenomenon in a conventional sense because the delays here are dominated by packet retransmissions rather than physical propagation delays. In one embodiment, there are several propagation paths due to reflections, which have different delay profiles. Each of these paths has its own delay PDF. Each packet is delivered through one of these paths depending on noise statistics. The probability of a packet delivery can be formulate as the following:

$$P_{delivery}(x) = P_{path-1}(x) + P_{path-2}(x) + \ldots + P_{path-K}(x) \quad (23)$$

where $P_{path}$-i (x) denotes probability of a packet delivery through path i with a delay x and shows the probability of packet delivery through at least one of the paths.

To differentiate between strong and weak signal environments, Table II (FIG. 11) shows experimental average delays at each location and variances of the average delays. Differences are noticeable in numbers at weak and strong signal locations. Thresholds can be set to distinguish between these two categories for either mean delays or variances. According to one example, the delay application 116 (FIG. 1) can determine the threshold based on RTT times in comparison to historical measurements, such as the historical measurements shown in Table II. In another example, the delay application 116 can be configured to define the threshold, such as by a user.

Thus, testing locations A, B, C, D, E, H, and I can be classified as strong signal locations, while the testing locations F, G, and J can be classified as weak signal locations. Representative joint models representing strong and weak locations can be obtained by combining measurements from various strong and weak signal locations. The statistical sample size of delay measurements for joint models is 15,000 in FIGS. 7A and B and Table II (FIG. 11).

Figure 8A:
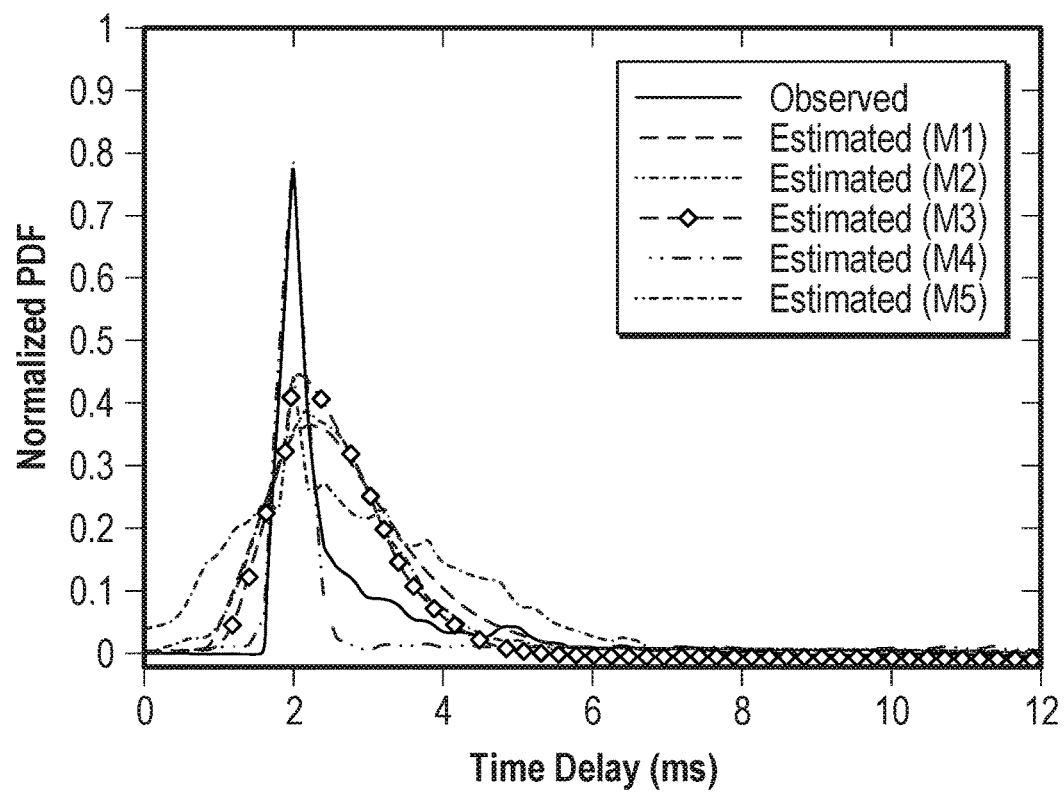
FIGS. 8A-C illustrate PDFs of PLC delay models for selected testing Location.
Figure 8B:
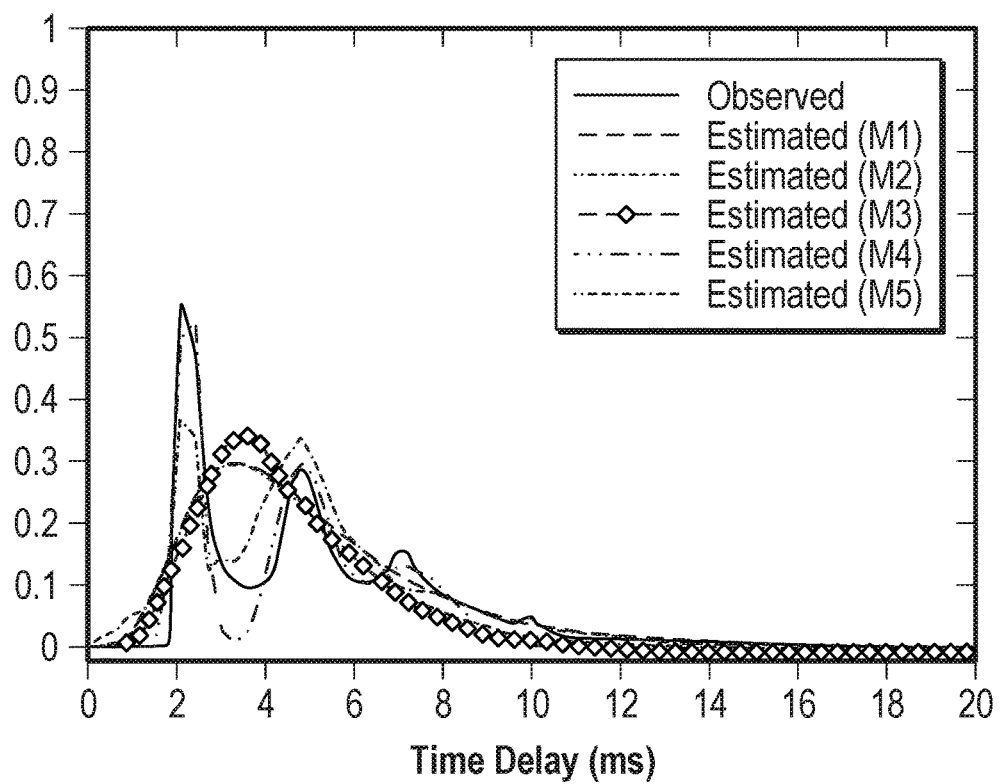
Figure 8C:
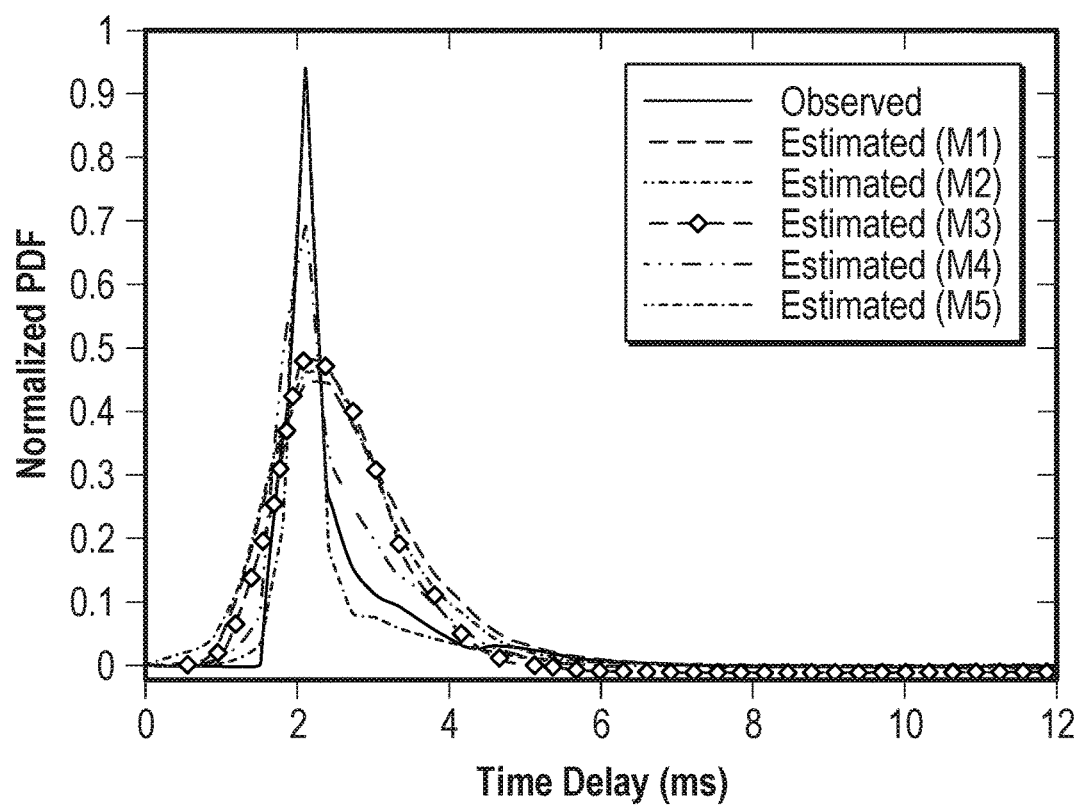

FIGS. 8A-C demonstrate PDFs of PLC delay models for selected testing locations, reference testing location A, joint weak signal, and joint strong signal conditions. FIG. 8A shows a data corresponding to a testing location A. FIG. 8B shows a joint weak signal condition while FIG. 8C illustrates a joint strong signal condition. The estimated parameters are shown in Table III (FIGS. 12A and 12B). The estimated parameters can be obtained using MLE for $M_1$-$M_3$ models and TRR for $M_4$ and $M_5$ models. Table III (FIGS. 12A and 12B) shows three quality-of-fit measures. In some embodiments, a combination of Rician, Gamma, and Lognormal distributions (e.g., $M_4$) may fit better for strong signal environments. At the same time, hybrid (mixture) model composed of Rician, Lognormal, Gamma, and Gaussian distributions ($M_5$) may be more appropriate for weak signal conditions.

For hybrid distribution weights in $M_4$ for the referenced location A and the joint strong signal scenario, the Lognormal and the Gamma distributions can dominate the percentage shares, respectively. For the joint weak signal scenario, the Rician distribution can dominate while the share of Gaussian distribution is minimal in the four-mixture hybrid model $M_5$.

The quality-of-fit measures give an idea of how good the fit is (the lower the index, the better the fit), and they are used to state a preference between the distributions. At the same time, large statistical sample sizes of measurements provide accurate models. The MLE approach for models, $M_1$-$M_3$, provides the following confidence intervals with 95% confidence levels. Table IV (FIG. 13) shows an example at location A for model $M_3$.

KS measurements between empirical and its source CDF can be estimated as $1.36/\sqrt{N}$ with 95% confidence level, where N is the sample size. For example, with 6000 samples, it is 0.0176. For the location A, the KS distance between $M_4$ and empirical cumulative distributions is 0.15 (Table III), which results in maximum KS distance between $M_4$ and source model as 0.1676 with 95% confidence level.

As the models are designed for the RTT data, one-way delays can be obtained by scaling, (i.e., dividing the generated data by two). In some embodiments, probabilistic models can be directly designed for one-way delays in a similar fashion.

Figure 9:
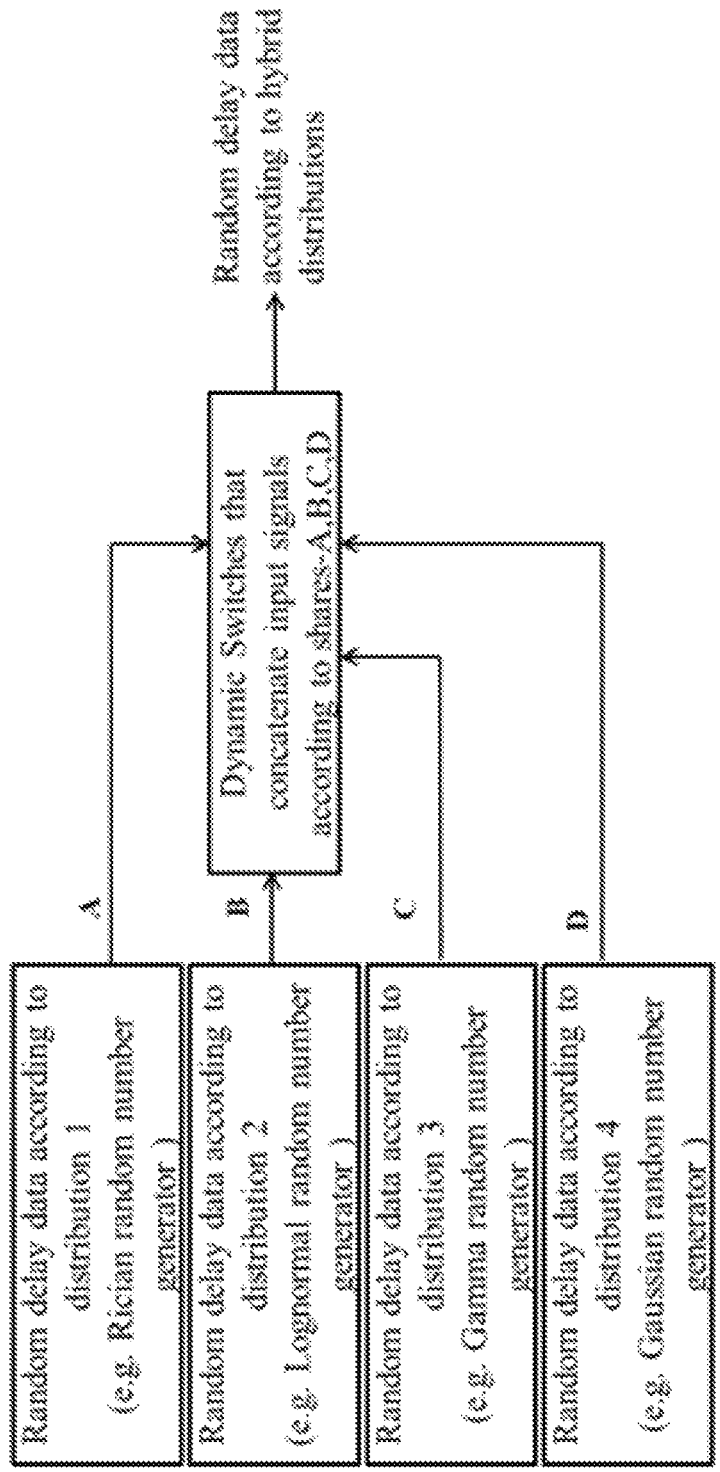
FIG. 9 illustrates a block diagram of PLC network delay hybrid generator.

Once the model parameters are estimated, delay data can be generated to assess delay impact for target applications, as shown in FIG. 9. The setup can include delay data generators by known distributions, which can be the components in analytical hybrid (mixture) distributions. Many software toolboxes can include common random number generators from Table I (FIG. 10) as functions with adjustable parameters. One can also generate the delay data using Gaussian random number generators.

The outputs from the component delay data generators can be combined to obtain hybrid delay data generators using dynamic switches. Dynamic switches can concatenate fragments of random delay generators according to distribution shares (weights) A, B, C, and D of mixture components. Average fragment durations can correspond to hybrid coefficients. Setting parameters of component distributions one can simulate various PLC delay models. The parameters can be selected according to the disclosure contained herein. The parameters can also be optimized for other environments using a similar process.

With reference to FIG. 14, the computing device 1400, such as PLC master device 103 and PLC terminal device 109, may comprise, for example, a server computer or any other system providing computing capability. In other embodiments, the computing device 1400 is a field programmable gate array (FPGA), an application-specific integrated circuit (ASIC), a programmable logic controller, or another electronic device. The computing device 1400 may employ a plurality of computing devices 1400 that may be arranged, for example, in one or more server banks or computer banks or other arrangements. Such computing devices 1400 may be located in a single installation or may be distributed among many different geographical locations. For example, the computing device 1400 may include a plurality of computing devices 1400 that together may comprise a hosted computing resource, a grid computing resource and/or any other distributed computing arrangement. In some cases, the computing device 1400 may correspond to an elastic computing resource where the allotted capacity of processing, network, storage, or other computing-related resources may vary over time.

Various applications and/or other functionality may be executed in the computing device 1400 according to various embodiments. Also, various data is stored in a data store 113 that is accessible to the computing device 1400. The data store 113 may be representative of a plurality of data stores 113 as can be appreciated. The data stored in the data store 113, for example, is associated with the operation of the various applications and/or functional entities described below.

The components executed on the computing device 1400, for example, include an operating system 1413, the delay application 116 (FIG. 1), and other applications, services, processes, systems, engines, or functionality not discussed in detail herein. The delay application 116 is described herein in a variety of embodiments and the application may be implemented according to these embodiments. It should be understood that delay application 116 may be described as a variety of different applications for different embodiments. The data stored in the data store 113 includes, for example, a list of previous delay measurements, start and end times of message transmissions, characterizations of the systems, a list of measurements for the current system, and any other data.

Therefore, the following is claimed:

1. A method comprising:
transmitting a plurality of packets from a PLC master device to a PLC terminal device via a PLC communication network;
measuring a plurality of round-trip time (RTT) timestamps for ones of the plurality of packets in the PLC master device;
determining, in the at least one computing device, an observed probability density function based on the plurality of RTT timestamps;
approximating, in the at least one computing device, a plurality of probability density functions, the plurality of probability density functions based at least in part on a combination of a plurality of different parameterized probability distributions; and
determining, in the at least one computing device, a respective weighting of contributions and parameters for the individual ones of the plurality of probability density functions based at least in part on a comparison of the ones of the probability density functions to the observed probability density function.

2. The method of claim 1, further comprising determining, in the at least one computing device, a quality of signal for the PLC communication network based at least in part on the plurality of RTT timestamps.

3. The method of claim 1, further comprising characterizing, in the at least one computing device, the PLC communication network based on the respective weightings and parameters for the ones of the plurality of probability density functions.

4. The method of claim 3, further comprising scheduling, in the at least one computing device, a plurality of subsequent transmissions based at least in part on the characterization of the PLC Communication network.

5. The method of claim 1, wherein the comparison is based on at least one of: a Kolmogorov-Smirnov index or least square value.

6. The method of claim 1, wherein the plurality of different probability distributions comprise at least one of: Lognormal, Gamma, Gaussian, Rician, or a combination of at least two of: Lognormal, Gamma, Gaussian, or Rician distributions.

7. The method of claim 1, further comprising optimizing, in the computing device, the plurality of probability density functions based on at least one of: a Maximum-Likelihood Estimation or a trust region reflective algorithm.

8. A system comprising:
a PLC communication network;
a PLC terminal device connected to the PLC communication network, the PLC terminal device configured to receive a plurality of packets and transmit a plurality of responses acknowledging receipt of the plurality of packets;
a PLC master device connected to the PLC communication network, the PLC master device configured to:
transmit the plurality of packets;
receive the plurality of responses;
measure a round-trip time (RTT) for ones of plurality of packets;
determine an observed probability density function based on the measured RTT;
approximate a plurality of probability density functions, the plurality of probability density functions based at least in part on a combination of a plurality of different parameterized probability distributions; and
determine a respective weighting of contributions and parameters for the individual ones of the plurality of probability density functions based on a comparison of the ones of the probability density functions to the observed probability density function.

9. The system of claim 8, wherein the PLC master device is further configured to characterize the PLC communication network based on an observed statistical property based at least in part on the measured RTT.

10. The system of claim 9, wherein the PLC master device is further configured to adjust scheduling of a plurality of subsequent transmissions of packets based on the observed statistical property.

11. The system of claim 9, wherein the observed statistical property is at least one of: a calculated probability density function (PDF), a comparison of a calculated PDF to ones of a plurality of approximated PDFs based on probability distributions, a mean of the plurality of RTT timestamps, variances in the plurality of RTT timestamps, or standard deviation of the plurality of RTT timestamps.

12. The system of claim 11, wherein the plurality of approximated PDFs are based on at least one of Lognormal, Gamma, Gaussian, and Rician.

13. The system of claim 11, wherein the plurality of approximated PDFs are based on at least one probability distribution, the at least one probability distribution being based on a combination of Lognormal, Gamma, Gaussian, and Rician distributions.

14. The system of claim 11, wherein the comparison is based on at least one of: a Kolmogorov-Smirnov index or a least square value.

15. The system of claim 11, wherein the PLC master device is further configured to optimize the approximated PDFs based at least in part on at least one of a Maximum-Likelihood Estimation or a trust region reflective algorithm.

16. The system of claim 8, further comprising a plurality of PLC devices comprising the PLC master device and the PLC terminal device and the PLC communication network further comprises a plurality of network paths, each of the plurality of network paths representing a path between a unique pair of PLC devices of the plurality of PLC devices.

17. The system of claim 16, wherein the plurality of PLC devices are configured to determine a corresponding quality of signal for each of the plurality of network paths.

18. The system of claim 8, wherein the quality of signal is further determined based at least in part on at least one of: a calculated probability density function (PDF), a comparison of a calculated PDF to ones of a plurality of approximated PDFs based on probability distributions, a mean of the plurality of RTT timestamps, variances in the plurality of RTT timestamps, or standard deviation of the plurality of RTT timestamps.

19. A method comprising:
receiving, in at least one computing device, PLC configuration data, the PLC configuration data comprising a digital model of at least one PLC network segment; and
approximating, in the at least one computing device, a characterization for the PLC network segment based at least in part on a delay data generator, a plurality of weighted parameterized probability density functions, and a plurality of previously measured network delays across a plurality of network segments.

20. The method of claim 19, wherein the characterization for the PLC network segment is further based at least in part on the PLC configuration data.

* * * * *